No. 792,724. PATENTED JUNE 20, 1905.
M. M. McKINNON.
FERTILIZER DISTRIBUTER.
APPLICATION FILED NOV. 11, 1904.
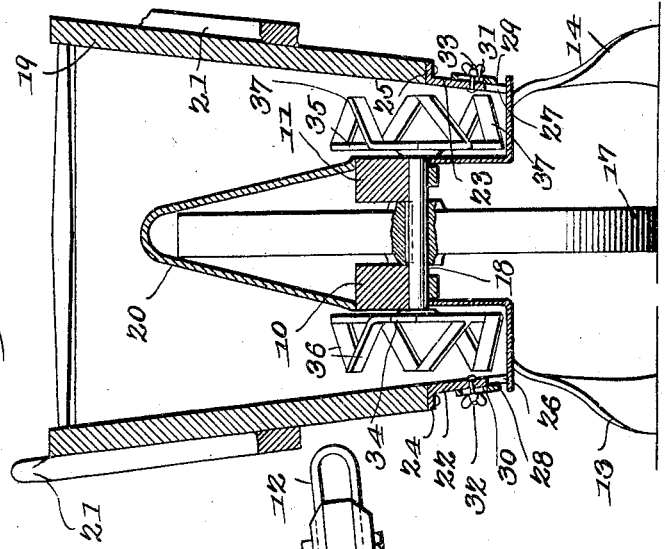
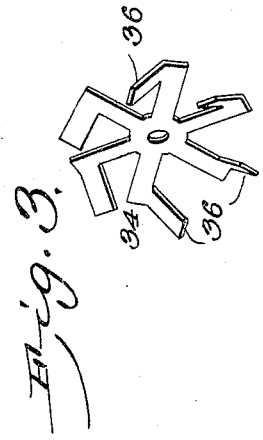
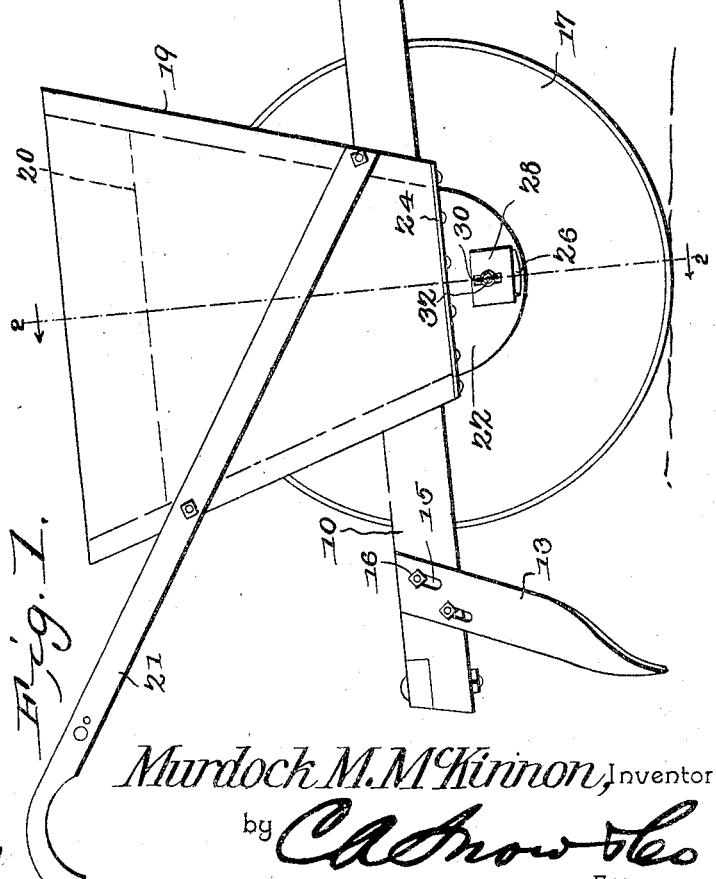
Witnesses
E. F. Stewart
C. H. Woodward
Murdock M. M. McKinnon, Inventor.
by C. A. Snow & Co.
Attorneys No. 792,724. Patented June 20, 1905.

UNITED STATES PATENT OFFICE.

MURDOCK M. McKINNON, OF LAURINBURG, NORTH CAROLINA.

FERTILIZER-DISTRIBUTER.

SPECIFICATION forming part of Letters Patent No. 792,724, dated June 20, 1905.

Application filed November 11, 1904. Serial No. 232,338.

*To all whom it may concern:*

Be it known that I, MURDOCK M. McKIN-NON, a citizen of the United States, residing at Laurinburg, in the county of Scotland and State of North Carolina, have invented a new and useful Fertilizer-Distributer, of which the following is a specification.

This invention relates to fertilizer-distributers, and has for its object to improve the construction and increase the efficiency of devices of this character.

With these and other objects in view, which will appear as the nature of the invention is better understood, the same consists in certain novel features of construction of a fertilizer-distributer, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a side elevation. Fig. 2 is a transverse section on the line 2 2 of Fig. 1. Fig. 3 is a perspective view of the distributer member detached.

The improved device comprises a supporting-frame formed of spaced side members 10 11, connected at one end to a draft-clevis 12 of any desired form and provided at their rear ends with covering members 13 14, preferably formed of sheet-steel blades, adjustably connected to the frame members, as by slots 15 and clamp-bolts 16.

The frame members are mounted upon a carrier-wheel 17 by an axle 18, and likewise mounted upon the frame members above the wheel is a receptacle 19 for the material to be distributed and recessed longitudinally to receive the wheel.

The receptacle is provided with an internal shield 20, preferably of sheet metal, and forming a covering to the portion of the wheel within the receptacle and likewise dividing the receptacle into two compartments. The guide-handles 21 are also connected to the receptacle 19 and extended rearwardly of the same.

The receptacle 19 converges, preferably, toward the lower end from all sides, and the compartments formed by the shield 20 are provided with chambers 22 23, depending from their contracted lower ends, the chambers being segmental in longitudinal section and provided with lateral flanges 24 25, by which they are secured to the bottom of the receptacle-compartments, as by screws or the like.

The segmental chambers are provided, respectively, with apertures 26 27 in their outer walls, and the apertures are provided with slides 28 29, adjustable, as by slots 30 31 and clamp-bolts 32 33, to control the area of the apertures. By this means the material will be discharged only outwardly and from the lowest points of the segmental chambers, which are substantially concentric to the wheel-axle 18.

Mounted for rotation upon the extended ends of the axle 18 and within the segmental portions 22 23 of the receptacle are distributer members consisting of radiating arms 34 35, having terminal blades 36 37 disposed obliquely to the longitudinal plane of the axle 18 and operating in close proximity to the inner surface of the segmental portions 22 23, the blades being reversely inclined, as represented in Fig. 2. By this means it will be obvious that as the machine is drawn forward over the ground the motion of the large carrier-wheel 17 will be imparted to the distributer members, which, rotating in the mass of material, will not only pulverize the latter, but forcibly eject it through the oppositely-extending apertures 26 27 by the inclined arrangement of the blades 36 37. Thus the material is distributed uniformly and in two rows as far apart as the distance between the discharge-apertures 26 27, which will be far enough to provide for supplying two rows of the fertilizer material between each two rows of the plants or in each furrow between the plants. The distributer members thus perform the twofold function of means for pulverizing the material and also as a means for forcibly feeding the same laterally from the two compartments of the receptacle. Thus each of the furrows in which the plants or seeds are to be deposited is provided with a supply of the fertilizer material in two parallel streams and only in such quantities as required, so that no waste occurs in its distribution.

The device is simple in construction, can be inexpensively manufactured, and will operate effectively and expeditiously.

Having thus fully described the invention, what is claimed is—

1. In a fertilizer-distributer, a supporting-frame, a bearing-wheel mounted for rotation between the members of the frame, a longitudinally-divided receptacle mounted upon the frame and provided with an internal shield to cover the wheel and to divide the receptacle into two compartments, segmental chambers depending from the receptacle outside of the frame members and provided with oppositely-discharging apertures in their side walls, and distributer members mounted for rotation upon the wheel-axle and operating in the segmental chambers and provided with spaced radial blades disposed obliquely to the longitudinal plane of the axle.

2. In a fertilizer-distributer, a supporting-frame, comprising spaced side members having a draft-clevis at their forward ends and spaced covering members at their rear ends, a bearing-wheel mounted for rotation between said frame members and in advance of said covered members, a receptacle divided longitudinally, and mounted upon said frame members above said wheel, and with an internal shield covering the wheel and dividing the receptacle into two compartments, segmental chambers depending from said receptacle outside said frame members, and provided with oppositely-extending discharge-apertures in their side walls, and distributer members mounted for rotation upon the extended ends of the axle of said bearing-wheel and operating in said segmental chambers, and provided with spaced radial blades, disposed obliquely to the longitudinal plane of said axle.

In testimony that I claim the foregoing as my own I have hereto affixed my signature in the presence of two witnesses.

MURDOCK M. McKINNON.

Witnesses:
J. M. McKINNON,
ANGUS McKINNON.